United States Patent [19]
McIntyre et al.

[11] Patent Number: 5,598,237
[45] Date of Patent: Jan. 28, 1997

[54] IMAGE CAPTURE APPARATUS

[75] Inventors: Dale F. McIntyre, Honeoye Falls; Kenneth M. Haas, Oakfield, both of N.Y.

[73] Assignee: Eastman Kodak Company, Rochester, N.Y.

[21] Appl. No.: 414,549

[22] Filed: Mar. 31, 1995

[51] Int. Cl.$^6$ .................................................... G03B 29/00
[52] U.S. Cl. .......................... 396/264; 396/419; 396/281
[58] Field of Search .................................... 354/81, 289.1, 354/293, 266, 267.1

[56] References Cited

U.S. PATENT DOCUMENTS

| | | | |
|---|---|---|---|
| 4,218,122 | 8/1980 | Drafahl, Jr. | 354/293 |
| 4,239,363 | 12/1980 | Sato | 354/238 |
| 4,582,410 | 4/1986 | Niwaya et al. | 354/293 |
| 5,361,115 | 11/1994 | Ohtsuka et al. | 354/400 |
| 5,384,609 | 1/1995 | Ogawa et al. | 354/81 |
| 5,389,986 | 2/1995 | Tsuji et al. | 354/81 |

*Primary Examiner*—Howard B. Blankenship
*Assistant Examiner*—Eddie C. Lee
*Attorney, Agent, or Firm*—David A. Howley; Charles E. Snee, III

[57] ABSTRACT

An image capture apparatus is operable in a hand-held condition and in a stabilized non-hand-held condition. The image capture apparatus includes means for automatically determining which condition the image capture apparatus is to be operated in and means for preventing operation of the image capture apparatus in the stabilized non-hand-held condition when it is to be operated in the hand-held condition. In preferred embodiments of the invention, at least one slower shutter speed or one longer focal length is prevented from being used when the image capture apparatus is to be operated in the hand-held condition. As such, the recordation of poor quality images is prevented because camera conditions which can lead to "camera shake" defects are locked out when the camera is to be operated in the hand-held condition.

15 Claims, 8 Drawing Sheets

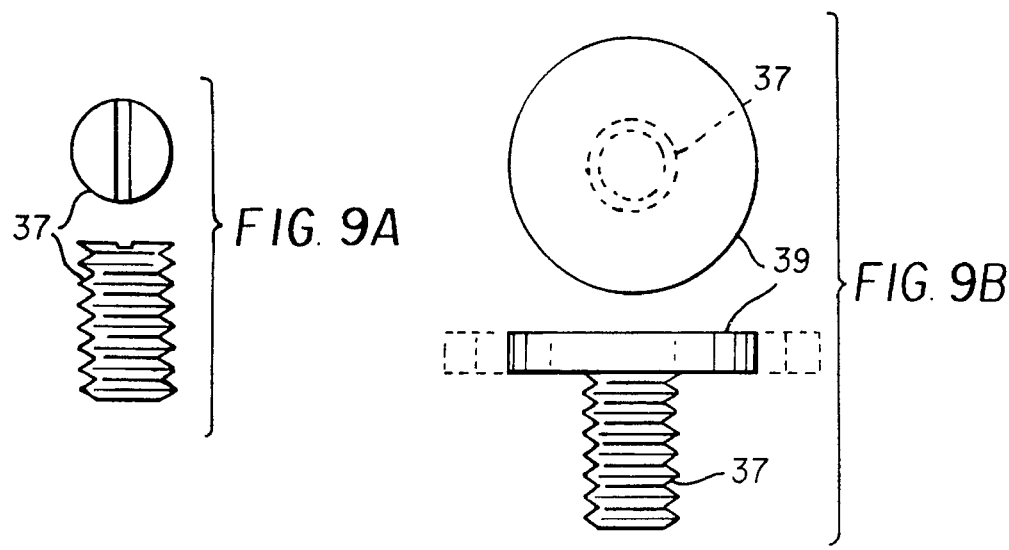
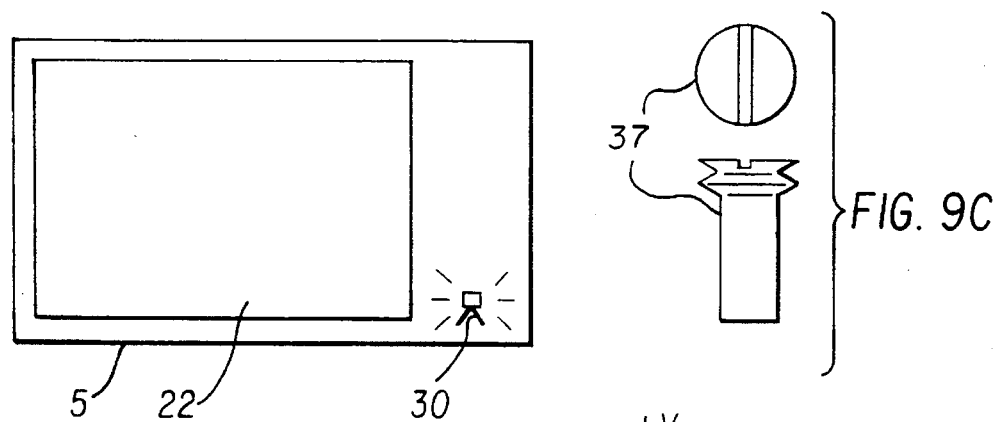
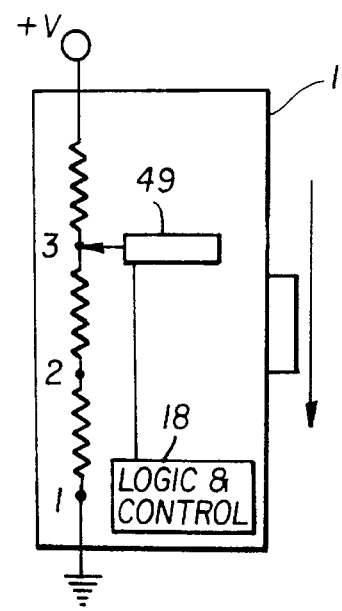

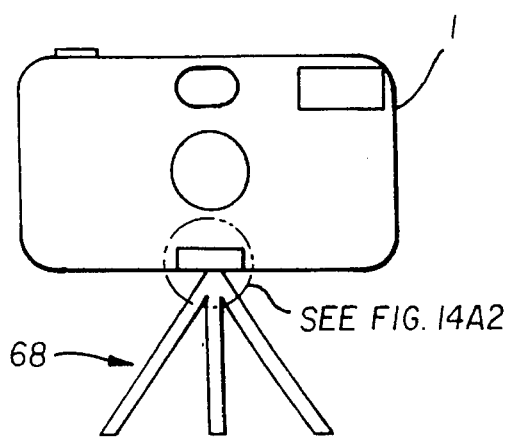
FIG. 14A1
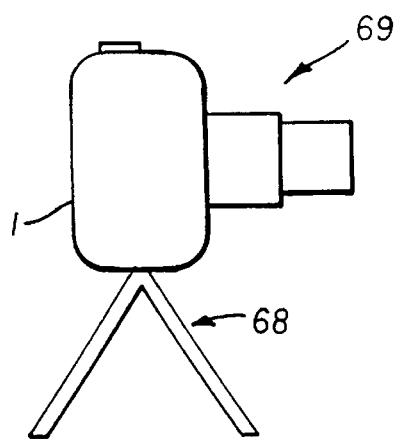
FIG. 14B
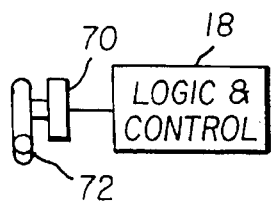
FIG. 14A2
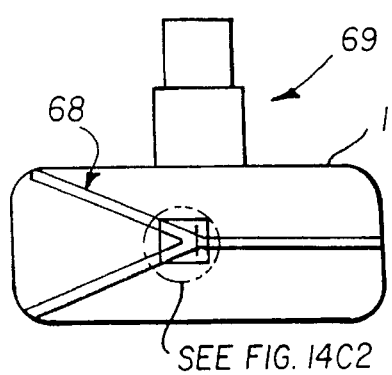
FIG. 14C1
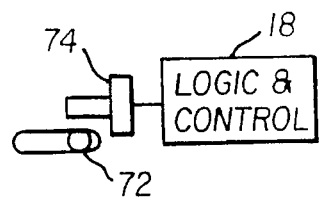
FIG. 14C2
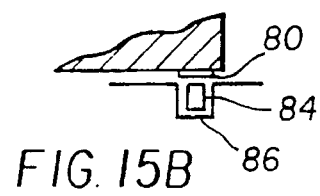
FIG. 15B
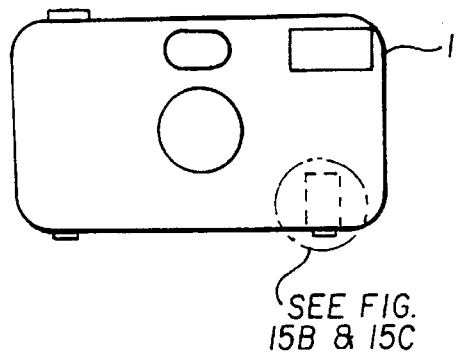
FIG. 15A
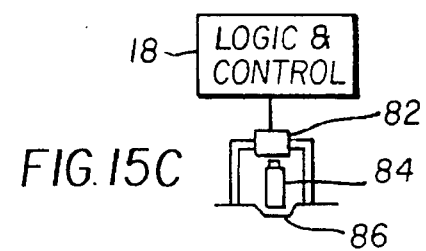
FIG. 15C

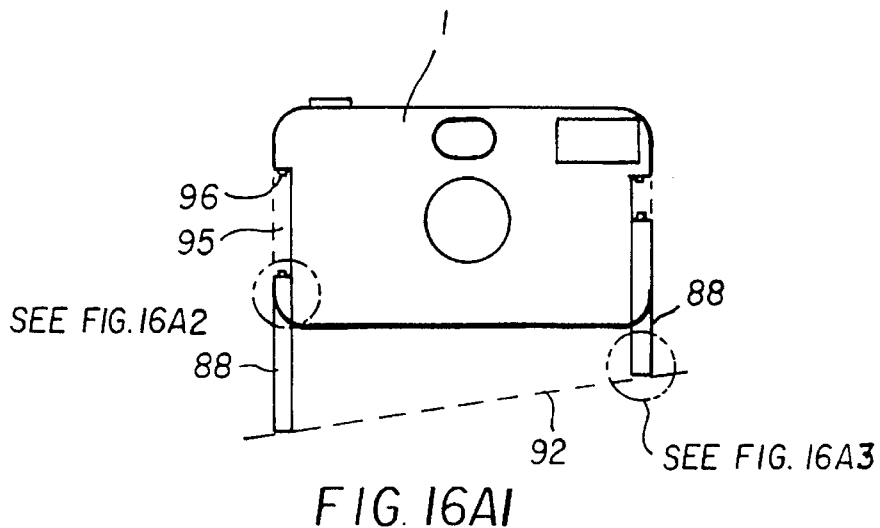
FIG. 16A1
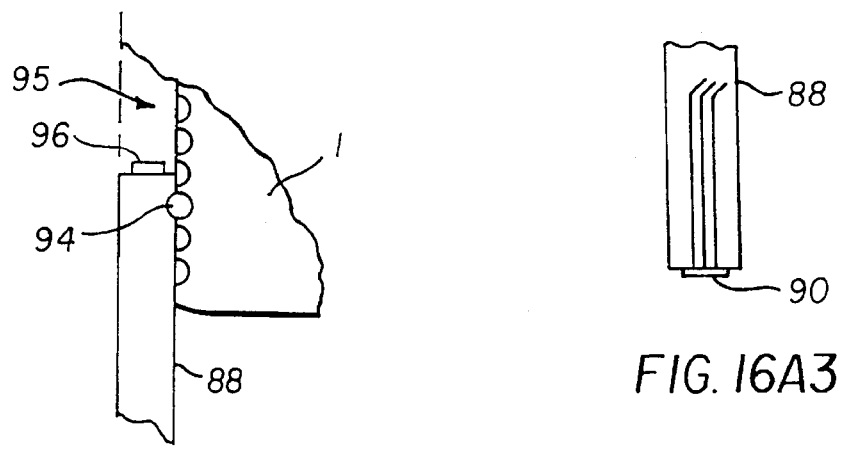
FIG. 16A2
FIG. 16A3
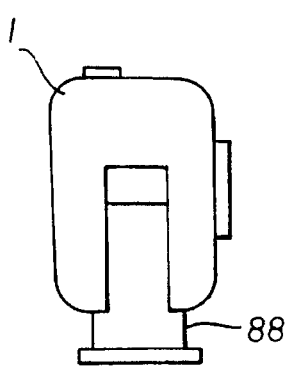
FIG. 16B
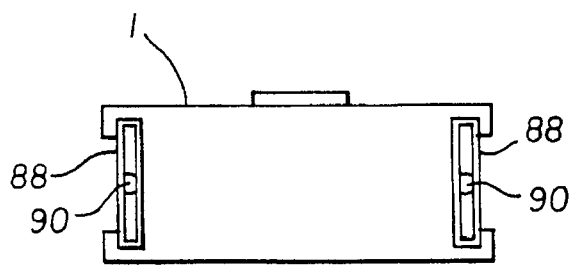
FIG. 16C

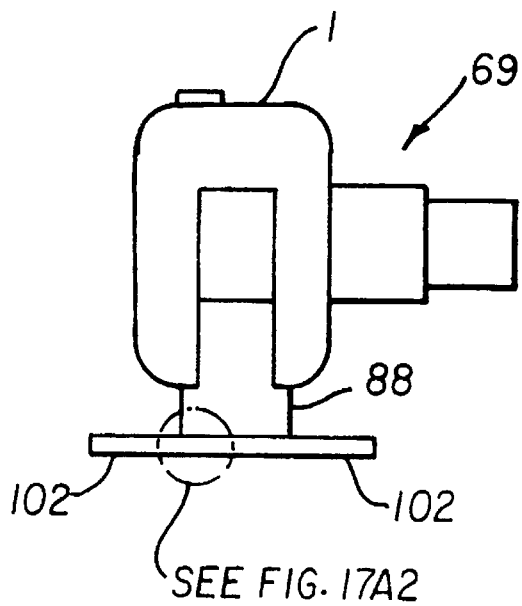
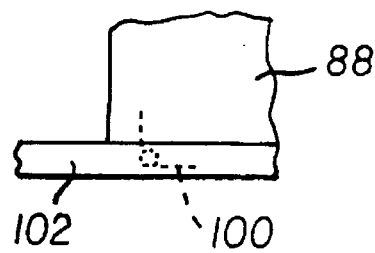
FIG. 17A1
FIG. 17A2
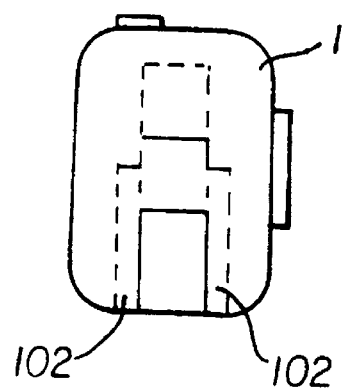
FIG. 17B

IMAGE CAPTURE APPARATUS

FIELD OF THE INVENTION

The invention relates generally to the field of image capture, and in particular to image capture apparatus. More specifically, the invention relates to an image capture apparatus which can automatically determine that it has been placed on a stable support.

BACKGROUND OF THE INVENTION

Image capture apparatus, such as photographic cameras, include a variety of components which can be operated in different ways according to scene conditions. For example, cameras typically include an aperture/shutter which can be operated at various speeds and at various aperture sizes according to the scene illuminance. When taking a picture in low light conditions, a slower shutter speed and larger aperture are used to collect sufficient light for image recordation. However, the use of a larger aperture decreases the depth of field which, in many cases, is undesirable.

Therefore it is often preferable to decrease the shutter speed rather than increase the aperture size in order to maintain a sufficient depth of field. However, as the shutter speed is decreased, it becomes increasingly difficult for the camera operator to hold the camera sufficiently steady while the shutter is held open during image recordation. If the camera is not held steady during relatively long shutter openings, "camera shake" can occur, causing a blurred image to be recorded on the film.

Cameras often include an optical zoom lens system in which lens elements are moved relative to each other and to the film plane in order to focus the camera at various distances from the camera. At longer focal lengths, it is important for the camera operator to hold the camera steady during image recordation. If the camera is not held steady, camera shake can again cause blurred images to be recorded on the film.

One method of capturing images in low light conditions and/or at long focal lengths is to position the camera on a stable support such as a table or a tripod via a tripod socket on the camera. With the camera attached to a tripod, the photographer is free to use much slower shutter speeds, therefore smaller apertures for greater depth of field, and longer focal lengths than would be possible if the camera were hand held. Tripods are also used to hold the camera while the photographer enters the scene to be recorded. In this situation, a self-timer or remote control is used to commence picture taking once the photographer is properly positioned in the scene.

A problem with the above-described apparatus is that the slowest shutter speeds and longest focal lengths are available to the camera user even when the camera is not placed on a tripod or other stable support. As a result, the camera operator may use a slow shutter speed and/or long focal length when taking a hand-held picture which results in a blurred image being recorded. Further, there is no provision to inform the camera logic and control that the camera has been positioned on a stable support.

A further problem with the prior art with respect to simple point and shoot cameras is that camera logic and control constrains the camera from using shutter speeds which are less than 1/focal length. The reason for this constraint is that blurred images will be recorded if slow shutter speeds are used when recording images while the camera operator holds the camera in his hands due to camera shake.

SUMMARY OF THE INVENTION

The present invention is directed to overcoming one or more of the problems set forth above. Briefly summarized, according to one aspect of the present invention, an image capture apparatus is operable in a hand-held condition and in a stabilized non-hand-held condition. The image capture apparatus includes means for automatically determining the condition in which the image capture apparatus is to be operated and means for preventing operation of the image capture apparatus in the stabilized non-hand-held condition when it is to be operated in the hand-held condition.

In preferred embodiments of the invention, at least one slower shutter speed or one longer focal length is prevented from being used when the image capture apparatus is to be operated in the hand-held condition. As such, the recordation of poor quality images is prevented because camera conditions which can lead to "camera shake" defects are locked out when the camera is to be operated in the hand-held condition.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 9a–c display several embodiments of dummy tripod screws used to trick the camera into thinking it is attached to a tripod when it is not;

FIG. 10 schematically shows a viewfinder from the camera of FIG. 1;

FIG. 12 discloses a switch used to change the camera operation among several exposure modes;

FIGS. 14a–c disclose a further embodiment of the invention in which a camera includes an integral deployable tripod;

FIG. 15a–c discloses another embodiment of the invention using a force sensor to detect when the camera is placed on a flat surface;

FIGS. 16a–c and 17a–b disclose a further embodiment of the invention using legs to support the camera on a tilted surface.

DETAILED DESCRIPTION OF THE INVENTION

The invention relates to affecting exposure control in an image capture device such as a still camera that changes the exposure mode to take advantage of the fact that the capture device has been mounted on a mechanical support such as a tripod. Firm mechanical support allows longer focal lengths, slower shutter speeds and smaller apertures creating sharper images with more depth of field than possible if hand held in the same ambient conditions.

Figure 1A:
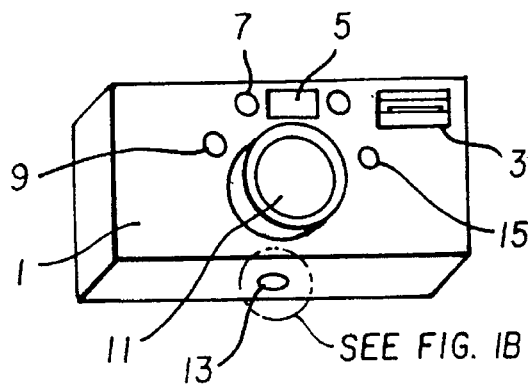
FIG. 1 is a perspective schematic view of a camera including a tripod socket.
FIG. 1B is an enlarged section view of a conventional tripod socket.
Figure 1B:
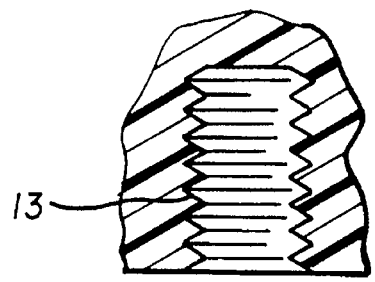

FIG. 1 illustrates a simple point & shoot camera 1 which includes an electronic flash 3 for providing supplemental illumination during low light image recordation. Camera 1 also has a viewfinder 5 for composing a scene, a triangulation autofocus system 7 for determining a camera-to-scene distance in order to properly focus the camera, and a light sensor 9 for measuring the ambient light level. A zoom lens system 11 is used to compose an image at a desired focal length onto the film plane or electronic image capture device (e.g. a charged-coupled-device array). The foregoing in this paragraph is well known to those skilled in the art.

Camera 1 further includes a detectable tripod socket 13 which is preferably located substantially centered on the bottom of the body of the camera. An indicator light 15 is used to inform a camera operator that the camera has been attached to a tripod or other similar attachment apparatus or placed on a support surface. Indicator light 15 can be the same light as used for normal self-timer mode. There are a number of ways to modify a purely mechanical tripod socket into an interactive electromechanical tripod socket which informs the camera logic and control when the camera has been attached to a tripod.

Figure 2:
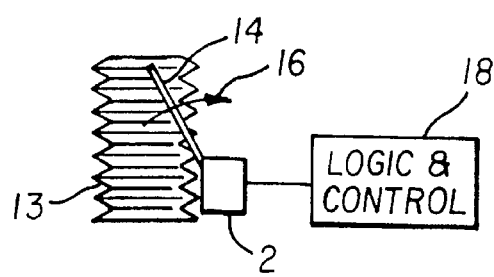
FIGS. 2–8 show various embodiments of a camera tripod socket which can detect that a tripod screw has been inserted into the socket.

FIG. 2 shows tripod socket 13 with a slot cut into its side to allow for the insertion into the socket of a lever arm 14 of a microswitch 2. The switch is actuated by mating tripod screw threads as the tripod screw is inserted to the proper depth into socket 13. The microswitch is spring biased in the counter-clockwise direction and is moved in the direction of an arrow 16 when a tripod screw is screwed into socket 13. Microswitch 2 is connected to a camera logic and control (microprocessor) 18 and informs the logic and control when camera 1 has been secured to a tripod.

Figure 3:
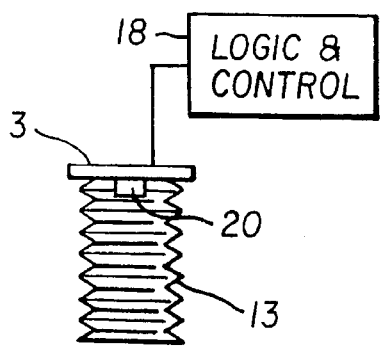

FIG. 3 shows a push button style switch 20 where the switch is actuated by the blunt end of the mating tripod screw as it reaches the proper insertion depth. Again, switch 20 is connected to a camera logic and control (microprocessor) 18 and informs the logic and control when camera 1 has been secured to a tripod.

Figure 4:
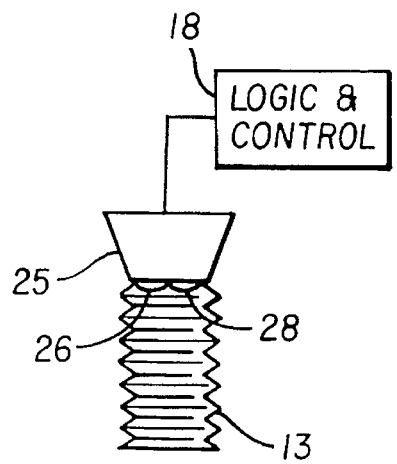

FIG. 4 shows a reflective sensor package 25 whereby light (typically infrared) is emitted from one lens 26, bounces (or not) off the lead end of the tripod screw, and returns to an internal photo receiver 28. This technique, however, is not as robust as the arrangement disclosed in FIGS. 1 & 2 as it doesn't guarantee that the mating tripod screw is inserted to the proper depth to insure a secure support has been achieved between the camera and tripod.

Figure 5A:
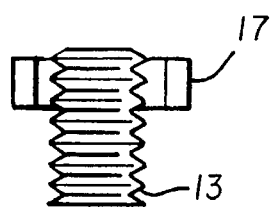
Figure 5B:
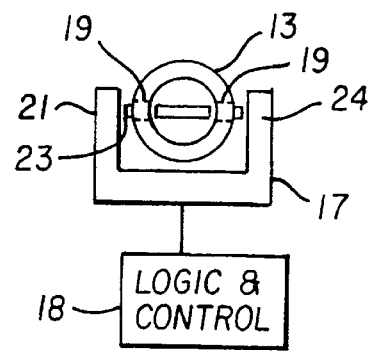

FIGS. 5A and B respectively show a side and bottom view of an embodiment in which a hole 19 is drilled through socket 13 orthogonally to the axis of screw insertion at the desired depth of the tripod socket. A through beam sensor 17 straddles socket 13 adjacent holes 19. This sensor includes an emitter 21 which emits light 23 (usually infrared) that passes through the socket via holes 19 to a receiver portion 24 of sensor 17. When a mating tripod screw is inserted into socket 13, the light is blocked by the screw, switching the output signal from the sensor to logic and control 18. As such, the camera is informed that it has been attached to a tripod.

Figure 6A:
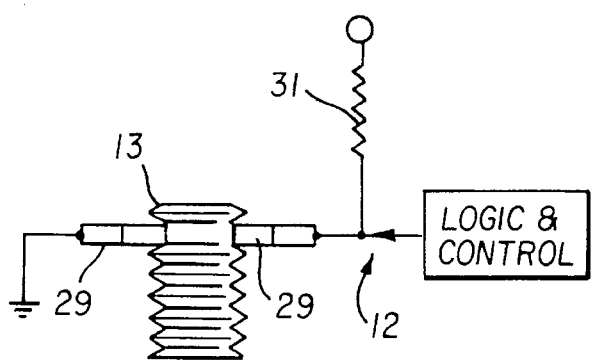

FIGS. 6A and B respectively show a side and top view of an embodiment in which two slots are cut into the sides of the socket 180 degrees apart. In the slots are respectively located two spring metal contacts 29 which are connected one side to ground and the other side to a "pull-up" resistor 31 which biases a signal line 12 to a high state when the tripod socket mating screw is absent. When the screw is properly inserted, it completes the circuit, shorting across the two spring clips, and pulls the signal down to a low state. As such, microprocessor 18 is informed when the camera is secured to a tripod.

Figure 6B:
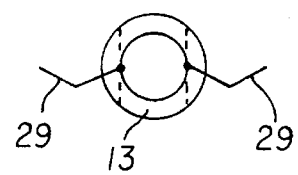
Figure 7:
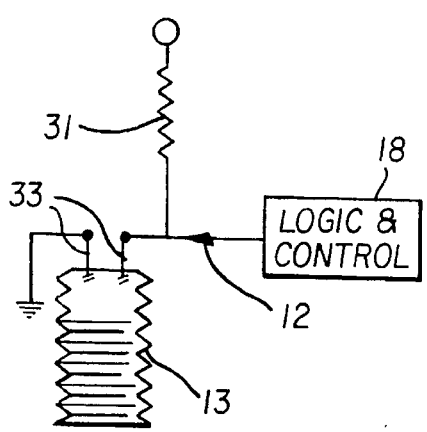

FIG. 7 shows a variation of the concept embodied in FIG. 6 whereby two spring loaded pins 33 are positioned to enter the socket at the bottom-most point of the socket. As a result, the tripod screw must be inserted to the proper depth into the socket to short across pins 13, thereby ensuring correct camera-tripod attachment. The techniques disclosed in FIGS. 6 and 7 make the assumption that the tripod mounting screw is made from a conductive material such as iron etc. Given the need to securely attach a camera to a tripod, tripod mating screws are usually made of metal.

Figure 8:
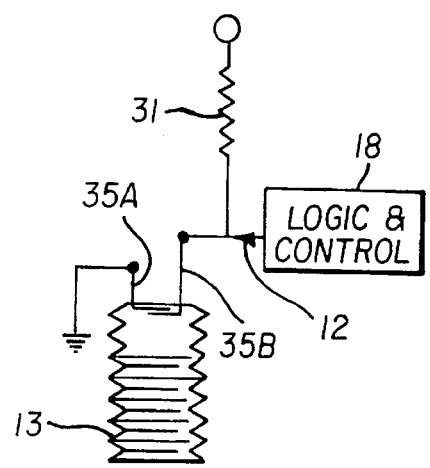

FIG. 8 shows yet another variation of FIG. 6 that doesn't require a metal screw and insures proper insertion depth. Two spring metal contacts 35A,B enter the socket at the bottom-most point of the socket and are positioned in proximity to each other in such a manner that a tripod mating screw inserted to the proper depth forces contact 35B against contact 35A to complete the circuit. Contact 35A is fixed in space against the bottom of the socket while the deflection of contact 35B creates the completion of the circuit, thus informing microprocessor of the tripod attachment.

In any of these scenarios, it is assumed that there is a tripod available to the camera user. However, low light and/or telephoto photographic conditions don't always correlate with the availability of a tripod, and as such, substitutions for the tripod are made. For example, a camera can be set up on a table, ledge, fence, car, etc. In these cases, a small, easily portable device as shown in FIGS. 9a–9c can be used to simulate to the sensing apparatus in the tripod socket that the camera is secured as though it was on a tripod.

FIG. 9a shows a screw 37 without a conventional head that can be inserted into the camera tripod socket flush with the camera bottom. Screw 37 is sized to actuate the sensing means within the socket. FIG. 9b shows a large rubber knob 39 that provides a stable, non-skid base for the camera when screw 37 is inserted into the tripod socket. This technique is most useful if the socket in the camera is centrally located on the camera bottom for the purposes of balance. Alternatively, FIG. 9c show a variation of screw 37 where the threaded portion of the device is minimized to shorten the time required for insertion of the screw into the tripod socket.

FIG. 10 shows viewfinder 5 which is used to provide additional feedback to the photographer that the camera has been secured to a tripod or placed on a stable support. Reference numeral 22 represents a scene viewing area in the viewfinder. An icon 30, located in the viewfinder, is illuminated to indicate to the camera operator that the camera has been secured to a tripod. When the camera logic and control is informed that the camera has been secured to a tripod, the logic and control enters a Stationary Exposure Mode (subsequently referred to as SEM) to calculate the camera's exposure parameters.

Figure 11:
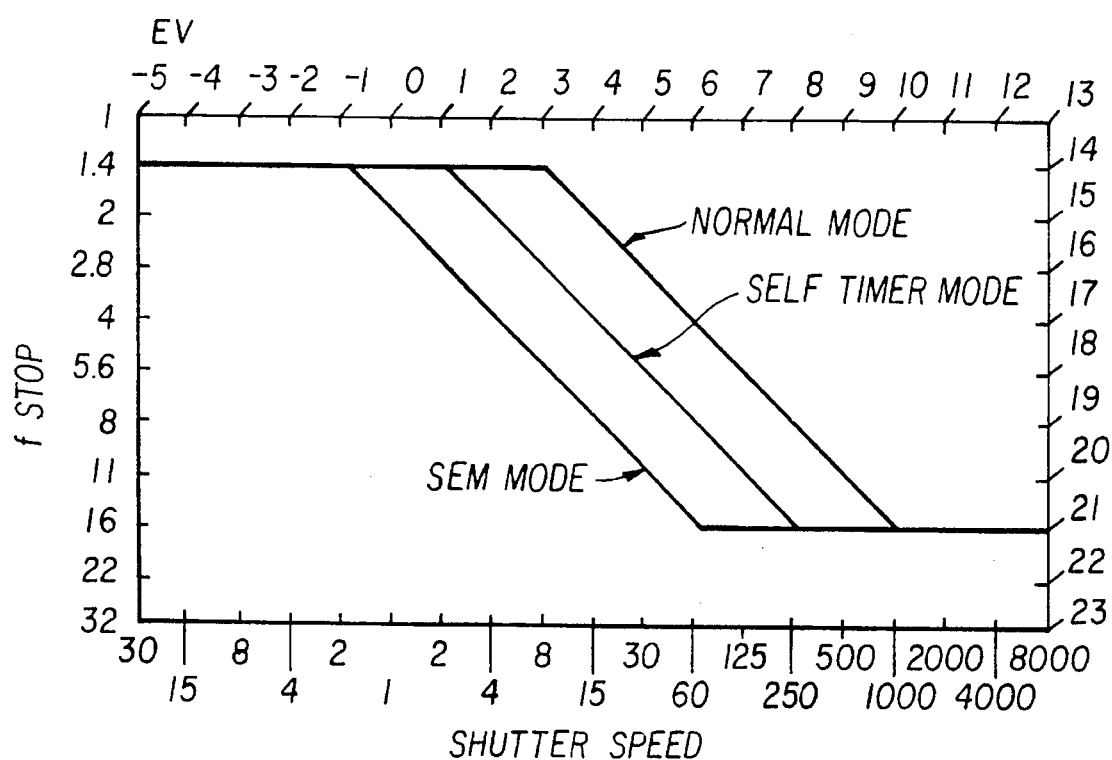
FIG. 11 shows exposure curves used by the camera logic to control exposure in several operating modes.

FIG. 11 shows one implementation of the SEM, used by the camera logic and control, on an exposure chart where at a given Exposure Value (EV), the SEM mode favors stopping down the aperture by two f-stops over the self-timer mode and subsequently slowing the shutter speed down by two stops to maintain the equivalent EV. A benefit of the slower shutter speeds is the ability to execute a slow sync flash picture in which the addition of pleasing ambient light is allowed with the longer shutter speeds. The two stop shift shown was for demonstration purposes only and should not be construed as the limitation of the invention. The appropriate shift in aperture/shutter speeds is left to the camera hardware or systems designer. In the SEM mode, the camera logic and control also enables one or more longer focal lengths to be used than when the camera is to be operated in the hand-held mode. When in the hand held mode, the logic and control prevents the one or more longer focal lengths from being utilized.

Due to the fact that a human hand depressing a shutter button on the camera imparts some low frequency motion to the camera, the SEM mode allows for a minimum delay time (e.g. 2 sec) between the pressing of the shutter button to the opening of the shutter for exposure. This minimum delay time allows for the imparted motion to damp out sufficiently that it can be considered that the tripod is a solid support.

Referring to FIG. 12, it is not, however, always advantageous to delay the firing of the shutter as described above. A photographer may not be willing to miss an important event, or he may feel confident that his support is very solid and not subject to imparted motion. In such a condition, it is convenient to have a switch 49 on camera 1 that can override this delay feature by moving the switch to a position "1". The switch, as shown in FIG. 12, also has a default position "2" for the SEM delay along with a position "3" for a self-timer feature which is a longer delay between pressing the shutter button and the execution of the actual exposure than the SEM delay. In an automatic self-timer mode, the programmed exposure calculation would not favor the slow shutter speeds as heavily as the SEM mode (see FIG. 11). Rather, the logic and control assumes that in self-timer mode, subject motion is more likely—portraiture as opposed to scenics (requiring slightly faster shutter speeds).

Figure 13:
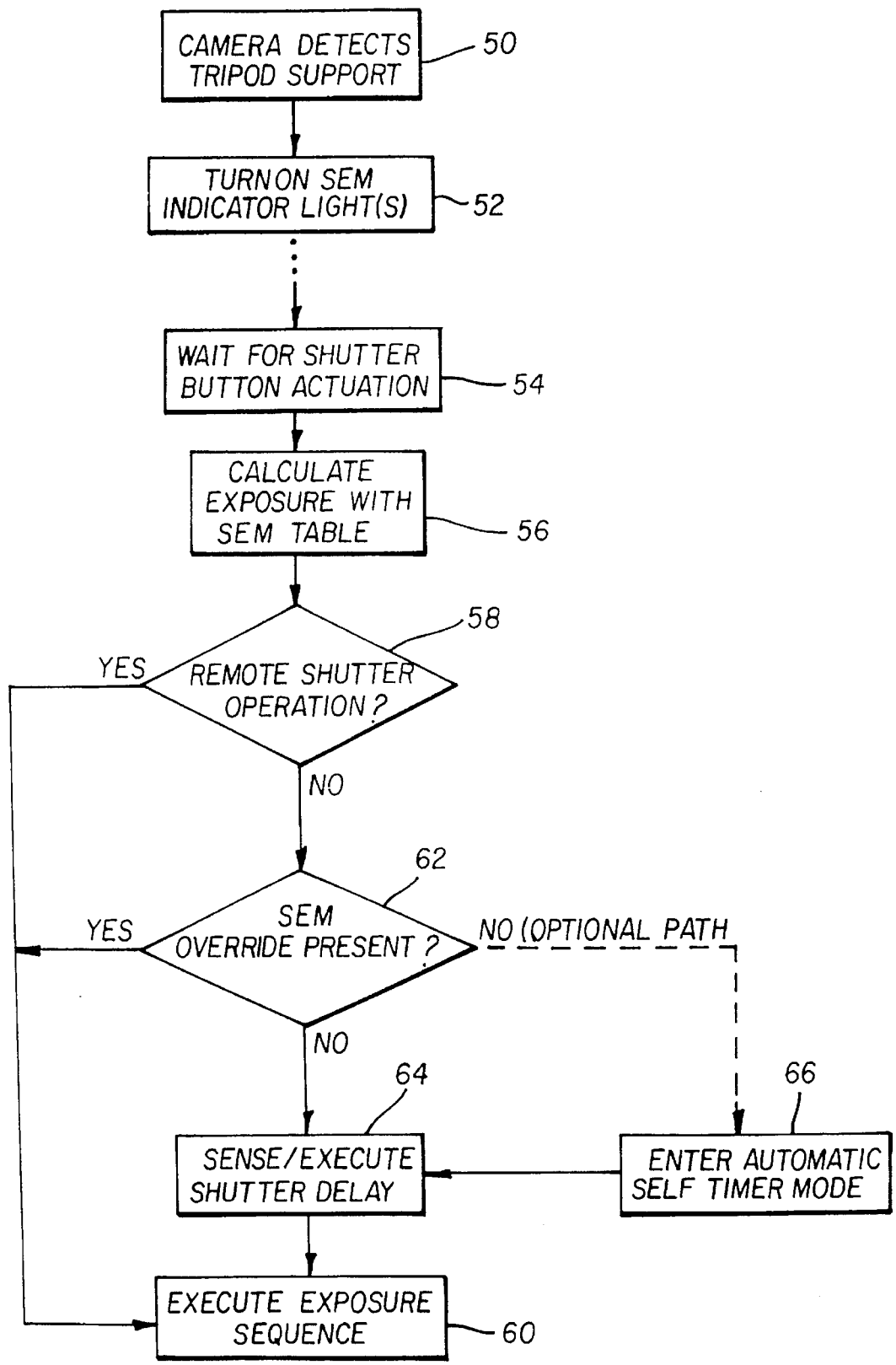
FIG. 13 is an algorithm used by the camera logic to control operation of the camera in various modes.

FIG. 13 shows an algorithm, used by the camera's logic and control, that looks for the SEM override feature and causes the camera to skip the automatic SEM delay. FIG. 13 also shows the algorithmic consideration for the self timer position. The main camera algorithm receives input at a step 50 that the camera body has been attached to a stable support (e.g. tripod) and branches to the program steps as shown in FIG. 13. At a step 52, the camera logic and control causes indicator lights 15 and 30 to be turned on. Turning on the lights can be done actively as in a dedicated I/O line and driver or it could be hard wired. When the logic detects that the shutter button is depressed at a step 54, the exposure algorithm uses the SEM algorithm (curve) at a step 56, as demonstrated in FIG. 11, to set the hardware control parameters for proper exposure. A check is made at a step 58 to see if the request for picture came from a remote control device via electromagnetic wave spectra, voice recognized command, or mechanical shutter release cable. If a remote control device was used, there is no need for delaying the shutter at all and the exposure is executed immediately at a step 60. If a remote control device was not used, a check is made of the SEM override switch at a step 62 which, if found to be true, also executes the exposure immediately at step 60. If the SEM override is not selected, the logic proceeds to a step 64 the appropriate shutter delay is executed and then the proper exposure sequence is commenced at step 60.

In a simpler camera, the self timer mode and the SEM mode cease to be distinct modes allowing the camera to automatically enter self-timer mode upon being mounted to a tripod. This is represented by the optional "NO" path out of decision diamond 62 which leads to a step 66 in which the camera automatically enters a self-timer mode. This reduces the complexity or burden imposed upon the less discriminating photographer while providing clear, sharp pictures.

Turning to FIGS. 14a–c, another embodiment of the present invention is shown. FIG. 14a discloses a front view of a camera with a deployable, built-in tripod 68 in an operational position. When in the operational position, a lever arm 72, movable with the tripod, closes a switch 70 to signal to the camera logic and control 18 to enter the SEM mode. FIG. 14b shows a side view of the camera with tripod in the operational position. A deployed zoom lens 69 often does not allow the camera to be set down to take a picture in a self-timer mode because the camera is off-balance. Tripod 68 corrects this problem by establishing a wider base on which to set the camera.

FIG. 14c is a bottom view of camera 1 and discloses tripod 68 in a stowed position when not in use. In order to move the tripod from its operational position to its stowed position, the tripod is first rotated 90 degrees such that arm 72 rotates away from switch 70. The opening of switch 70 tells the camera logic that the camera will not be operated in the SEM mode. Next, the tripod legs are rotated up towards the camera body where the legs are stored in recesses in the bottom of the camera and held in place by detents in the recesses. A small, portable mating support can create opportunities to use the extended exposure program without carrying a conventional tripod along.

FIG. 15 shows a further embodiment of the invention in which two devices are disclosed for detecting when camera 1 has been set down on a stable support surface. A gravitational force transmitter 84 is enclosed with a compliant membrane 86. When the camera is set on a flat surface, the weight of the camera causes the gravitational force transmitter to engage either a push-button 82 or a force-sensor 80 to signal to camera logic 18 to enter the SEM mode. Preferably, the force transmitters are located at the four corners of the bottom surface of the camera.

FIGS. 16a–c disclose yet another embodiment of the invention. A pair of deployable legs 88 can be slid into and out of the camera body at different, adjustable lengths. This is advantageous because the camera can be set safely and level on an uneven surface 92. An electro-force sensor 90 is positioned on the bottom of the legs and is used to signal to the camera logic that the camera has positioned on a steady surface. A spring loaded detent 94 on each leg provides a latching action into cavities 95 on each leg, thereby providing the adjustability of height for each leg. Electrical contact between force sensor 90 and camera 1 can be achieved with sliding electrical contacts. For example, if detent 94 is made of an electrically conductive material, it can be used to make electrical contact with the camera. A hall effect sensor can also be used to inform the camera logic that legs 88 have been moved from their stowed position. FIG. 16b discloses how legs 88 are integrated into camera 1. FIG. 16c is a bottom view of the camera and discloses the location of the legs on the camera and the position of electro-force sensor 90 on legs 88.

FIGS. 17a–b disclose a further enhancement of the embodiment shown in FIGS. 16a–c. As legs 88 are moved away from their stowed position, spring-loaded feet 102 are extended 90 degrees from the leg to provide additional support for camera 1. Feet 102 are particularly useful in stabilizing a zoom lens camera when the lens 69 is deployed to a long focal length, thereby shifting the camera's center of gravity. A torque spring 100 is used to deploy legs 102 into their operational position. In order to stow the legs and feet, the feet are first manually rotated towards the leg and then the leg is manually pushed back into the camera body.

By enabling an image capture apparatus to automatically sense when it is placed on a physical support structure, such as a tripod or stable support surface, the image capture apparatus can automatically extend its exposure program to allow slower shutter speeds to create sharper images via greater depth of field. Further advantages are the automatic allowance of longer focal lengths and the ability to place the image capture apparatus into a self timer mode automatically.

Positioning of the camera on a stable support doesn't guarantee lack of image motion due to the impact of the finger on the shutter button for exposure. An advantage of the invention is the ability to delay the shutter trip during this mode for a period of time that allows the imparted motion to dampen out. When the shutter is tripped from a non-mechanical interface (i.e. remote control means), the shutter delay is automatically removed.

The invention has been described with reference to a preferred embodiment. However, it will be appreciated that variations and modifications can be effected by a person of ordinary skill in the art without departing from the scope of the invention.

PARTS LIST

| | | | |
|---|---|---|---|
| 1 | camera | 35A,B | spring-metal contacts |
| 2 | microswitch | | |
| 5 | viewfinder | 37 | screw |
| 7 | autofocus system | 39 | knob |
| 9 | light sensor | 49 | switch |
| 11 | resistor | 50–66 | logic steps |
| 12 | signal line | 68 | built-in tripod |
| 13 | tripod socket | 69 | zoom lens |
| 14 | lever arm | 70 | switch |
| 15 | indicator light | 72 | lever arm |
| 16 | arrow | 80 | force-sensor |
| 17 | sensor | 82 | push-button |
| 18 | logic and control | 84 | gravitational force transmitter |
| 19 | hole | | |
| 20 | switch | 86 | complaint membrane |
| 21 | emitter | 88 | deployable legs |
| 22 | scene viewing area | 90 | electro-force sensor |
| 23 | light | 92 | uneven surface |
| 24 | receiver | 94 | spring-loaded detent |
| 25 | sensor package | 95 | cavities |
| 26 | lens | 100 | torque spring |
| 28 | photoreceiver | 102 | feet |
| 29 | metal contacts | | |
| 30 | icon | | |
| 33 | spring-loaded pins | | |

We claim:

1. A camera for capturing images, comprising:

means for setting at least one of shutter speed, focal length, or aperture of the camera to establish for the camera a first set of exposure parameters for operation in a first, hand-held condition and a second set of exposure parameters for operation in a second, stabilized non-hand-held condition;

means for determining whether the camera is to be operated in the first condition or the second condition; and means, responsive to the means for determining, for preventing use of a portion of the second set of exposure parameters when the camera is to be operated in the first condition.

2. A camera according to claim 1, wherein the means for determining comprises means for detecting that the camera has been placed on a stable support for operation in the second condition.

3. A camera according to claim 1, wherein the camera includes a shutter having faster and slower shutter speeds; and the portion of the second set of exposure parameters includes at least one slower shutter speed to be prevented from use in the first condition.

4. A camera according to claim 1, wherein the camera includes a zoom lens having longer and shorter focal lengths; and the portion of the second set of exposure parameters includes at least one longer focal length to be prevented from use in the first condition.

5. A camera according to claim 1, further comprising a tripod socket, wherein the means for determining comprises means for detecting that a tripod has been engaged with the tripod socket.

6. A camera according to claim 5, further comprising a dummy tripod attachment member, not attached to a tripod, for engagement with the tripod socket, thereby enabling use of the second set of parameters when the camera is to be operated in the first condition.

7. A camera according to claim 1, further comprising means for automatically placing the camera in a self-timer mode when the camera is to be operated in the second condition.

8. A camera according to claim 1, further comprising a tripod integral with the camera, the tripod being movable between a storage position and an operational position for supporting the camera, the tripod being interfaced with the means for determining such that when the tripod is moved from the storage position to the operational position, the camera is determined to be in the second condition.

9. A camera according to claim 1, wherein the means for determining comprises one or more sensors positioned on a bottom surface of the camera for sensing when the camera has been placed on a stable support surface.

10. A camera according to claim 1, further comprising a pair of legs for supporting the camera, the legs being movable between a storage position and an operational position for supporting the camera, the legs being interfaced with the means for determining such that when the legs are moved from the storage position to the operational position, the camera is determined to be in the second condition.

11. A camera according to claim 10, wherein the legs each include a spring-loaded foot which deploys when said legs are moved to the operational position, the feet providing additional stability for the camera.

12. A camera according to claim 1, further comprising;

a shutter button for commencing operation of the camera; and means for delaying operation of the camera after the shutter button has been manually operated with the camera in the second condition.

13. A camera according to claim 12, further comprising manually operable means for overriding the means for delaying.

14. A camera according to claim 12, further comprising:

means, responsive to a remote control signal, for commencing operation of the camera; and means for automatically overriding the means for delaying when operation of the camera is commenced by a remote control signal.

15. A camera according to claim 1, further comprising:

means for placing the camera in a self-timer mode; and means for emitting visible light in a first mode when the camera is in the self-timer mode and in a second mode when the camera is in the second condition.

\* \* \* \* \*